United States Patent [19]

Iwai et al.

[11] Patent Number: 4,630,446
[45] Date of Patent: Dec. 23, 1986

[54] OUTBOARD MOTOR WITH TURBO-CHARGER

[75] Inventors: Tomio Iwai, Hamamatsu; Yukio Matsushita, Iwata, both of Japan

[73] Assignee: Sanshin Kogyo Kabushiki Kaisha, Shizuoka, Japan

[21] Appl. No.: 614,439

[22] Filed: May 25, 1984

[30] Foreign Application Priority Data

May 27, 1983 [JP] Japan ................. 58-92340
May 27, 1983 [JP] Japan ................. 58-92341
May 27, 1983 [JP] Japan ................. 58-92342

[51] Int. Cl.⁴ ............................... F02B 37/00
[52] U.S. Cl. ........................ 60/602; 60/314; 60/605; 60/613
[58] Field of Search ............... 60/602, 603, 605, 613, 60/312, 313, 314; 123/65 BA, 65 E, 73 S

[56] References Cited

U.S. PATENT DOCUMENTS

| | | | |
|---|---|---|---|
| 2,581,668 | 1/1952 | Kadenacy | 123/65 I X |
| 2,583,430 | 1/1952 | Kadenacy | 60/613 X |
| 3,576,102 | 4/1971 | West | 60/602 |
| 3,692,006 | 9/1972 | Miller et al. | 60/314 X |
| 3,808,807 | 5/1974 | Lanpheer | 123/65 E X |
| 4,120,156 | 10/1978 | McInerney | 60/602 |
| 4,522,029 | 6/1985 | Tomita et al. | 60/314 |
| 4,539,813 | 9/1985 | Tomita et al. | 60/314 |

FOREIGN PATENT DOCUMENTS 57-186626 11/1982 Japan.
14995 of 1912 United Kingdom ............... 123/44 C Primary Examiner—Michael Koczo
Attorney, Agent, or Firm—Ernest A. Beutler

[57] ABSTRACT

Disclosed are several embodiments of a turbo-charged two cycle internal combustion engines utilized in combination with an outboard motor are disclosed. In each embodiment, the exhaust system for the engine includes devices for insuring that sufficient backpressure is exerted at the exhaust port of one cylinder during the overlap period when its scavenge passages and exhaust ports are both open so as to preclude the discharge of fresh fuel/air mixture to the atmosphere without adversely affecting the turbo-charger performance. In some embodiments of the invention, a valve arrangement is controlled for controlling the proportion of the exhaust gases that flow across the turbo-charger so that at some running conditions, the turbo-charger receives all of the exhaust gases. In all embodiments, an expansion chamber device is incorporated in the drive shaft housing of the outboard motor and in some embodiments, the turbo-charger turbine inlet receives its gases from this expansion chamber.

22 Claims, 14 Drawing Figures

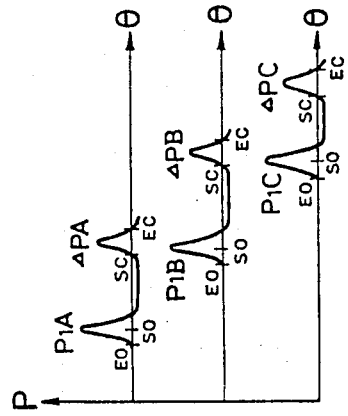
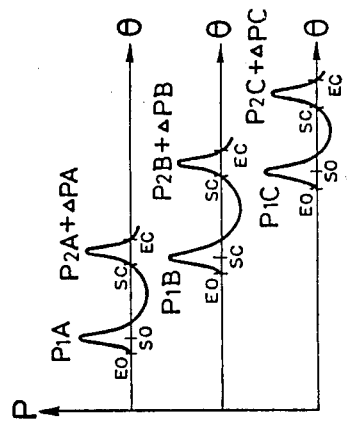
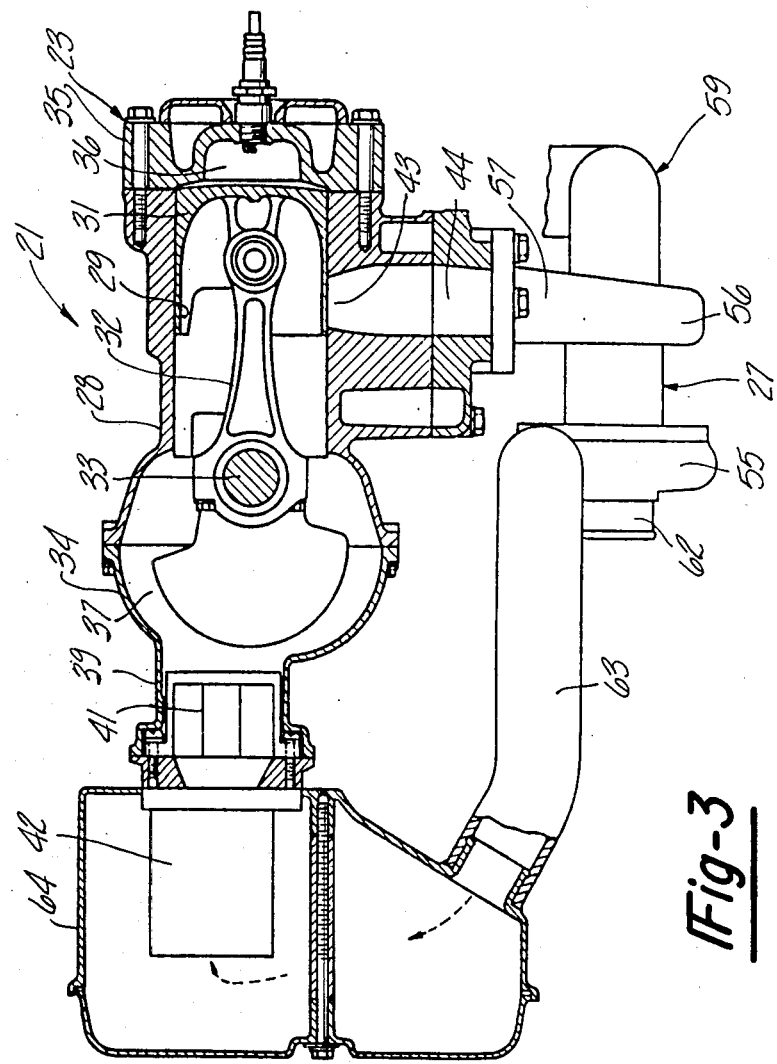

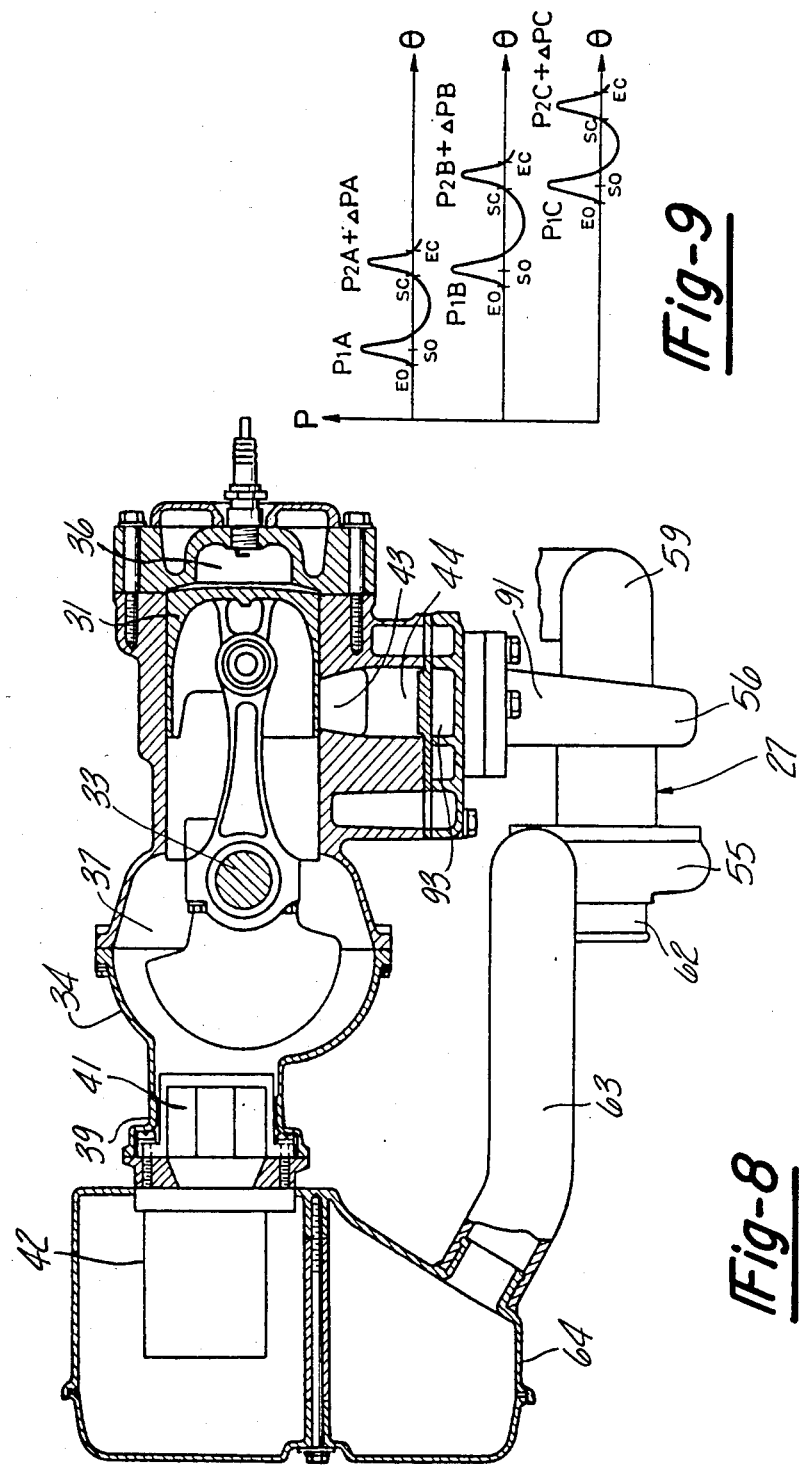

4,630,446

OUTBOARD MOTOR WITH TURBO-CHARGER

BACKGROUND OF THE INVENTION

This invention relates to an outboard motor with a turbo-charger and more particularly to an improved turbo-charging arrangement for internal combustion engines, particularly those of the two cycle type.

Recently, there has been an increased interest in the use turbo-charging so as to increase the power of an internal combustion engine without increasing its size or displacement. Although turbo-charging is a very effective way of increasing engine power, it has the well known disadvantage that power is increased primarily at the higher engine speeds. Such internal combustion engines in most applications are required to operate over a wide variety of engine and load speeds, turbo-charging therefore may not provide the desired power increase throughout the entire engine speed range.

It is, therefore, a principal object of this invention to provide an improved turbo-charging arrangement that will improve the power output at relatively low engine speeds.

It is another object of this invention to provide an improved turbo-charger arrangement that is effective to increase power at relatively low engine speeds thus rendering it applicable for use with outboard motors.

A very popular form of internal combustion engine is the two cycle type. Such type of engines enjoy wide usage in outboard motors and also in relatively small displacement motorcycles. The two cycles engine has a number of advantages, primarily simplicity. Of course, it has been also proposed to employ turbo-charging for improving the output of two cycle engines. However, with crankcase compression two cycle engines, it has been the practice to employ porting arrangements for multiple cylinders engines wherein the firing impulse of one cylinder is used to generate a positive pressure in the exhaust of another chamber so as to prevent the fresh air fuel mixture charge from being discharged from the exhaust port during the periods of overlap between the exhaust port opening and the scavenge port opening. Because of the use of such exhaust tuning to effect what might be considered as "static super-charging", it has been difficult to employ turbo-charging with two cycle engines without adversely affecting performance, particularly at lower engine speeds.

It is, therefore, a further object of this invention to provide an improved turbo-charging arrangement for two cycle engines.

Although turbo-charging has been employed with two cycle engines, it application to outboard motors has been relatively limited. One reason for this is the extreme compact nature of an outboard motor and the difficulties presented in locating a turbo-charger for such a motor in a convenient and safe location and also in providing the adequate flow of exhaust gases to drive the turbo-charger.

It is, therefore, a still further object of this invention to provide an improved, turbo-charged outboard motor.

SUMMARY OF THE INVENTION

A first feature of this invention is adapted to be embodied in a turbo-charging arrangement for an internal combustion engine having an exhaust chamber for receiving exhaust gases from the engine chamber and an outlet from the exhaust chamber. A turbo-charger is also incorporated that has a turbine stage inlet communicating with the exhaust chamber upstream of the outlet and a turbine outlet. Valve means are provided for closing the outlet during at least some running conditions for directing substantially all of the flow of exhaust gases from the exhaust chamber to the turbo-charger turbine stage inlet.

Another feature of the invention is adapted to be embodied in a turbo-charger arrangement for a two-cycle, crankcase compression, multiple cylinder internal combustion engine comprising an exhaust collector for receiving exhaust gases from the cylinders, an exhaust system including an expansion chamber for receipt of the exhaust gases from the exhaust collector and a turbo-charger having a turbine stage exhaust inlet and an exhaust discharge. In accordance with this feature of the invention, the turbine stage inlet is in communication with the expansion chamber for driving the turbine from the exhaust gases in the expansion chamber.

A further feature of this invention is adapted to be embodied in a turbo-charged outboard motor comprising a power head including a two cycle, crankcase compression, multi-cylinder internal combustion engine and a turbo-charger for delivering a boost to the inlet charge for the engine. A drive shaft housing positioned below the power head encloses an exhaust expansion device for receiving exhaust gases from the engine and for discharge thereof beneath the water line and a lower unit depends from the drive shaft housing. A spacer plate is positioned between the power head and the drive shaft housing and has means for delivering exhaust gases from the engine to the expansion device and for communicating exhaust gases with the turbo-charger.

BRIEF DESCRIPTION OF THE DRAWINGS

FIG. 3 is a horizontal cross-sectional view taken generally along the line 3—3 in FIG. 2.

FIG. 4 is a graphical analysis showing the pressure adjacent the exhaust outlets of the cylinders under one running condition.

FIG. 5 is a graphical analysis, in part similar to FIG. 4, showing another running condition.

FIG. 8 is a cross-sectional view taken generally along the line 8—8 of FIG. 7.

FIG. 9 is a graphical view, in part similar to FIGS. 4 and 5, showing the pressure conditions in accordance with this embodiment.

DETAILED DESCRIPTION OF THE PREFERRED EMBODIMENTS

Embodiment of FIGS. 1 Through 5

Figure 1:
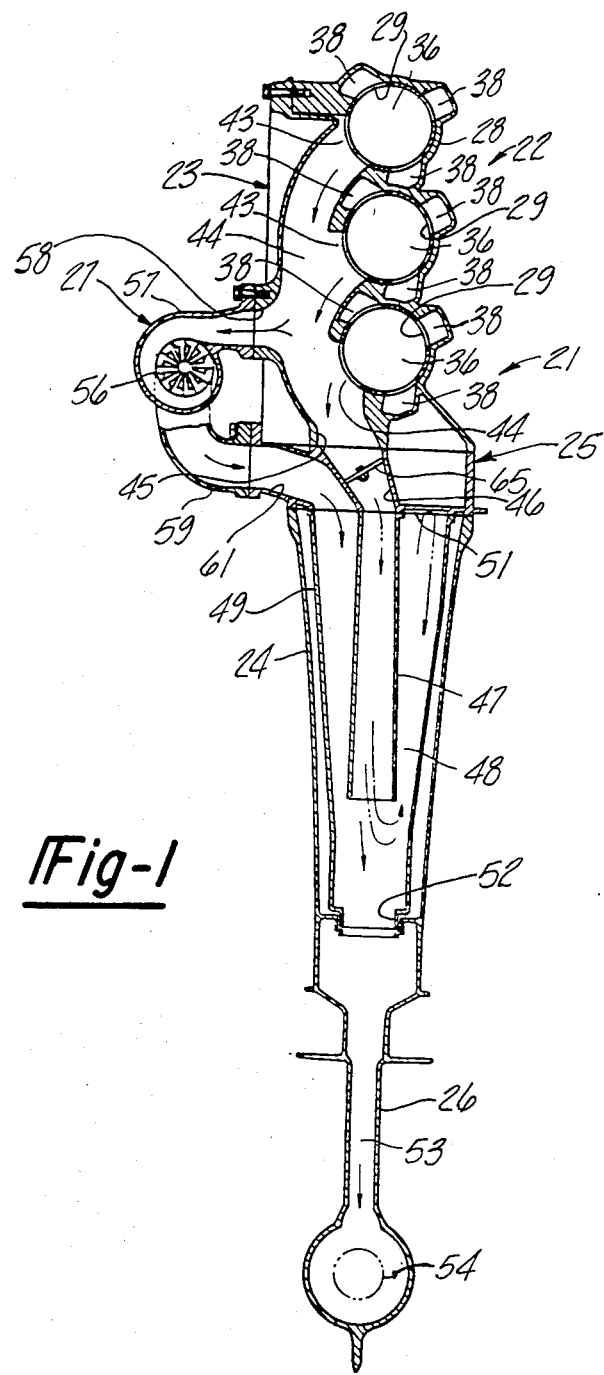
FIG. 1 is a vertical cross-sectional view taken through an outboard motor constructed in accordance with a first embodiment of the invention.
Figure 2:
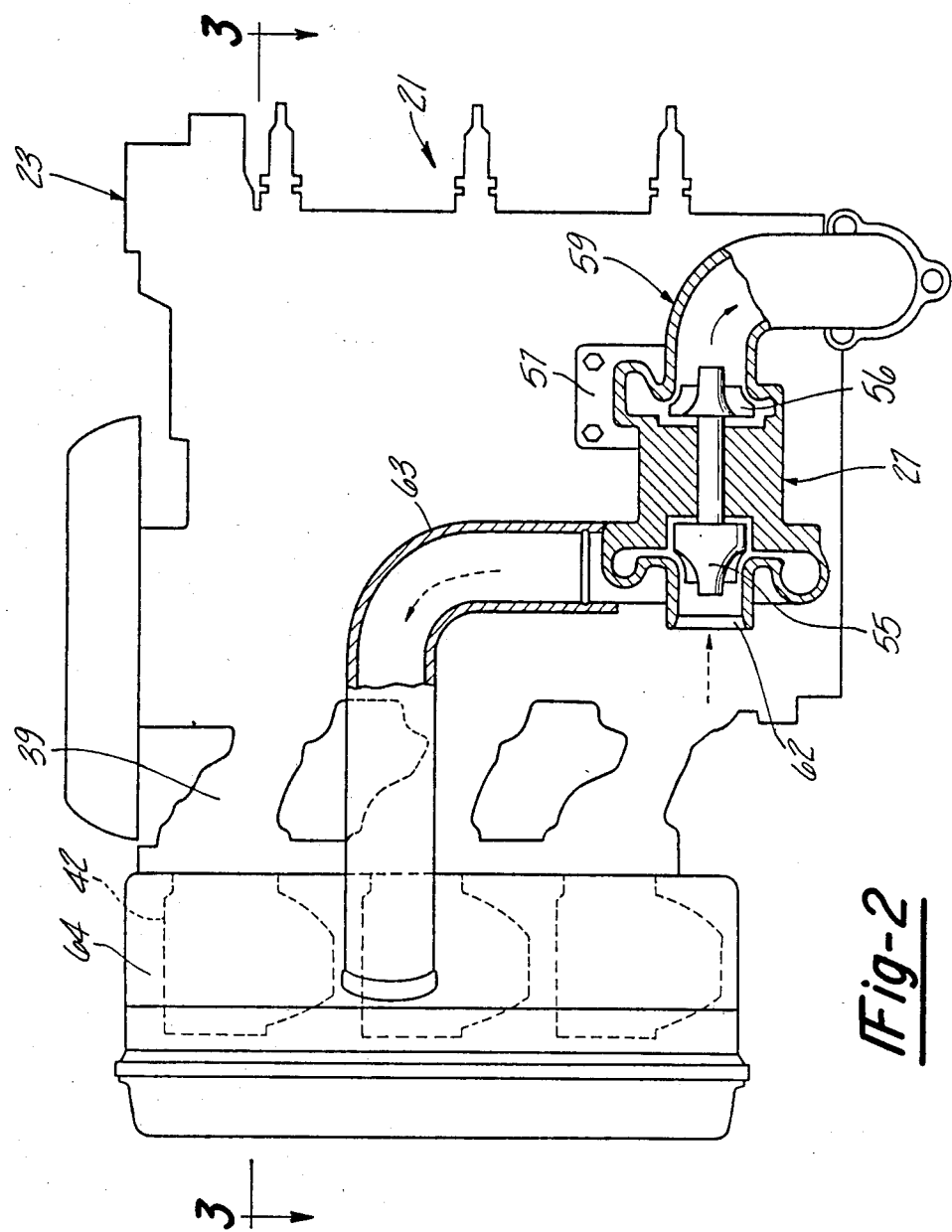
FIG. 2 is a side elevational view, with portions broken away, of the internal combustion engine associated with the outboard motor of the embodiment of FIG. 1.
Figure 6:
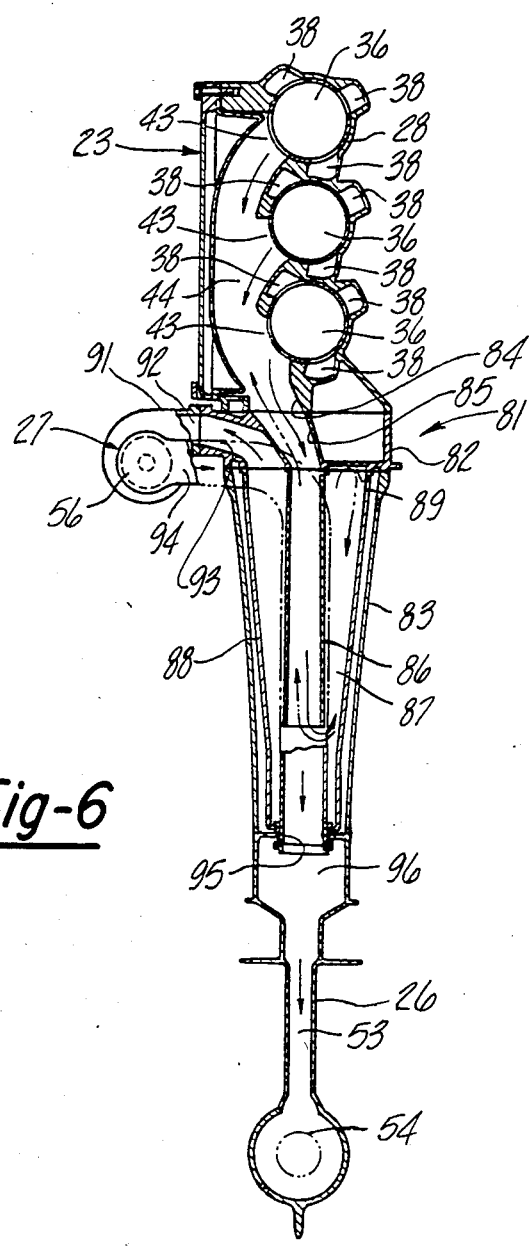
FIG. 6 is a vertical cross-sectional view, in part similar to FIG. 1, showing another embodiment of the invention.
Figure 7:
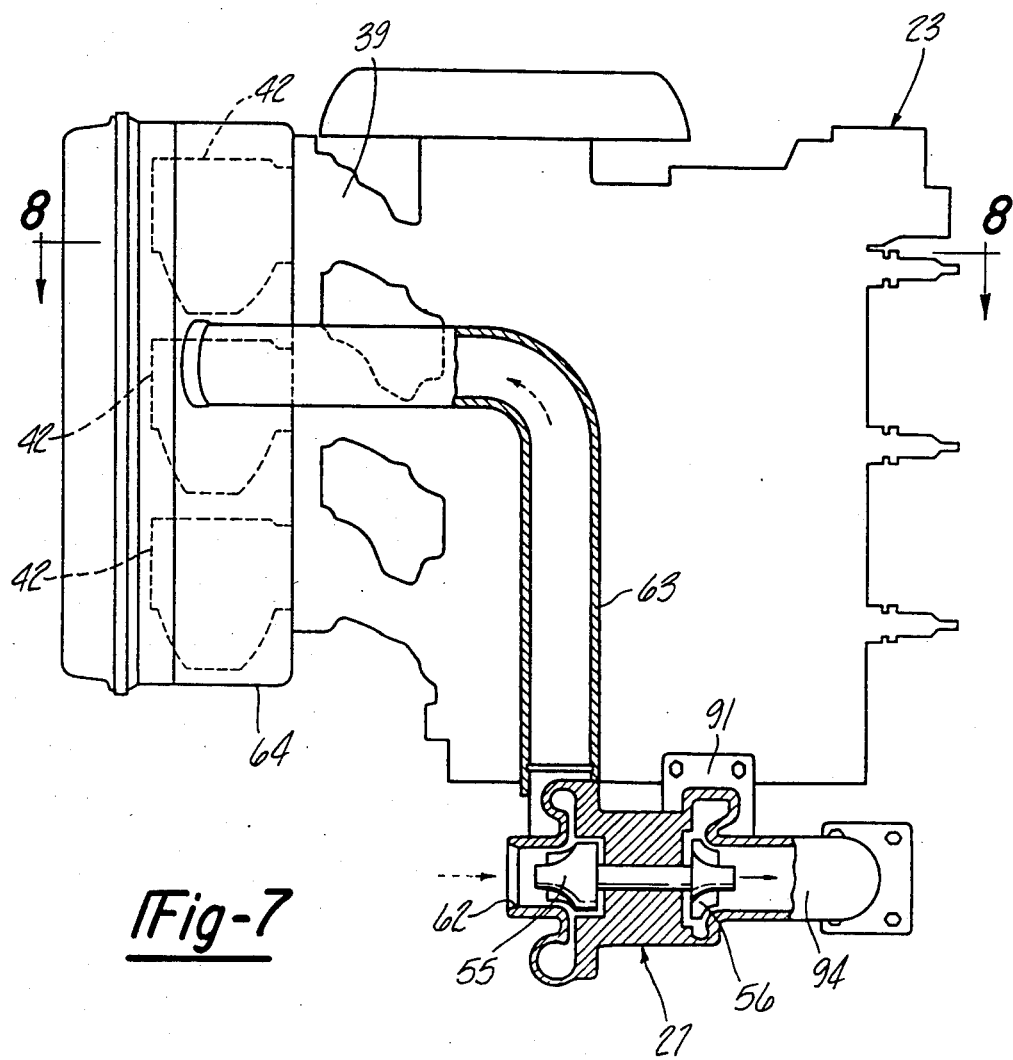
FIG. 7 is an enlarged side elevational view of the power head of the embodiment of FIG. 6, with a portion broken away.
Figure 10:
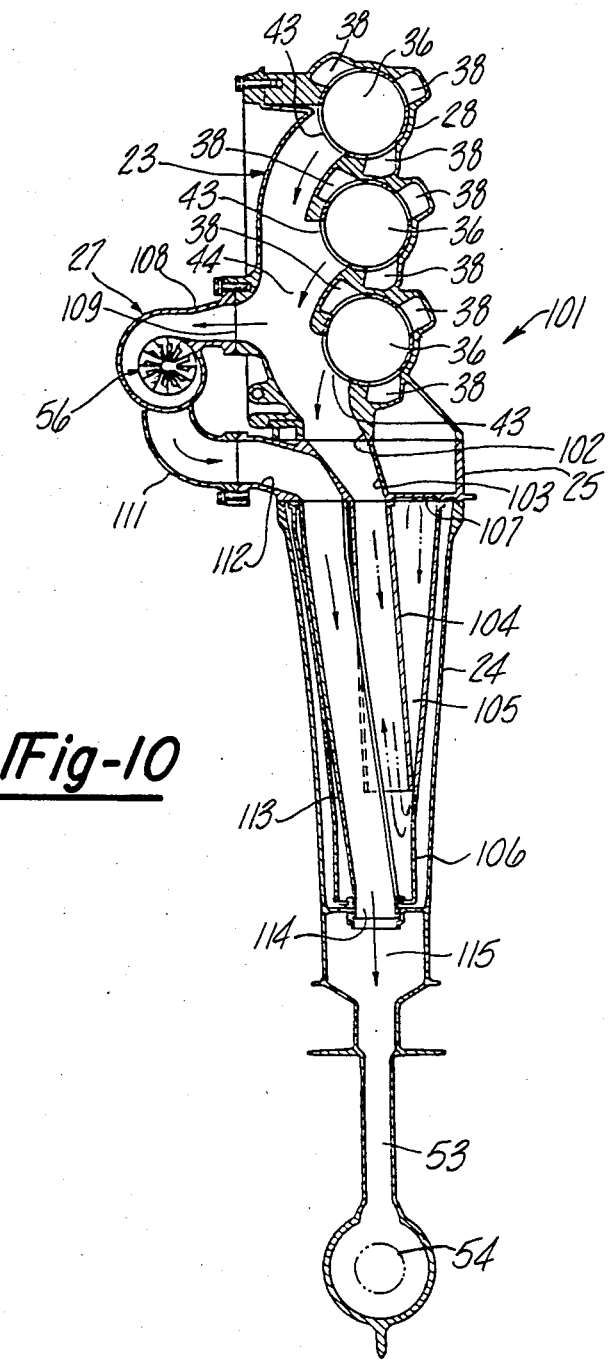
FIG. 10 is a vertical cross-sectional view, in part similar to FIGS. 1 and 6, and shows a still further embodiment of the invention.
Figure 11:
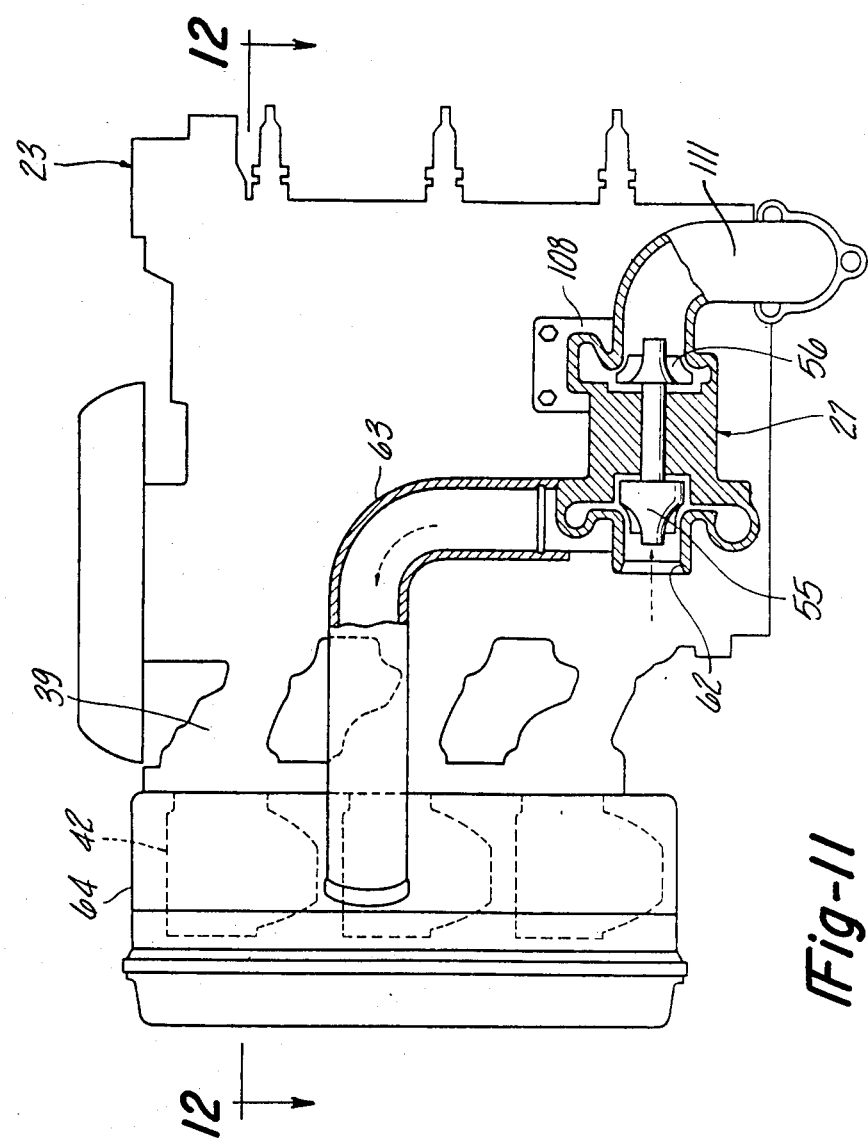
FIG. 11 is an enlarged side elevational view of the engine of the embodiment of FIG. 10.

An outboard motor constructed in accordance with a first embodiment of the invention is identified generally by the reference numeral 21. The outboard motor 21 includes a power head, indicated generally by the reference numeral 22 and which includes an internal combustion engine 23. In accordance with the embodiments of the invention described in detail, the engine 23 is of the three cylinder in-line, two cycle crankcase compression type. The engine 23 is surrounded by a protective cowling, as is typical with this type of assembly, and which protective cowling has been removed to more clearly show the construction. Depending beneath the engine 23 is a drive shaft housing 24 that is connected to the engine 23 by means including a spacer plate, indicated generally by the reference numeral 25. A lower unit 26 depends from the drive shaft housing 24.

In the drawings, the components which enable the outboard motor 21 to drive the associated watercraft such as the propeller, forward, neutral, reverse transmission, propeller shaft and propeller have not been illustrated since they may be of any conventional construction. In addition, the basic construction of the engine 23, except for its exhaust system and the associated turbo-charger, indicated generally by the reference numeral 27, and its relationship to the induction system, may be considered to be conventional and for that reason only those components necessary to understand the invention have been illustrated in detail.

The engine 23 includes a cylinder block 28 in which three cylinder liners form respective cylinder bores 29. Pistons 31 are supported for reciprocation within the respective cylinder bores 29 and are connected by means of connecting rods 32 to a crankshaft 33 that is journaled for rotation between the cylinder block 28 and a crankcase 34 in a known manner about a vertically extending axis. As is well known with outboard motors, the crankshaft 33 drives the drive shaft which extends vertically through the drive shaft housing 24 for driving the propeller of the lower unit 26 in a known manner.

A cylinder head 35 is affixed to the cylinder block 28 in a known manner and has a plurality of recesses 36, each of which cooperates with the piston 31 and cylinder bore 29 so as to form a combustion chamber, as is well known.

The cylinder block 28 and crankcase 34 define a plurality of sealed crankcase chambers 37 for each of the combustion chambers 36. During reciprocation of the pistons 31, the chambers 37 transfer a fuel/air mixture to the combustion chambers through a plurality of scavenging or transfer passages and ports 38. The fuel/air charge is admitted to the crankcase chambers 37 by means of an intake manifold 39 having individual runners serving each of the chambers 37. Reed type valves 41 control the flow through these runners from a respective carburetor 42 so as to prevent backflow, as is known in this art.

Exhaust ports and passages 43 extend through a side of the cylinder block 28 and are selectively uncovered by the pistons 31 during their reciprocation so as to discharge the exhaust gases from the combustion chambers 36. The exhaust passages 43 all merge into a common exhaust chamber or manifold 44 so that the individual exhaust gases from each cylinder will pass into the chamber 44. The construction thus far described may be considered to be conventional and, for that reason, detailed descriptions of the various components of the engine 23, not necessary to understand the invention, have been deleted.

The manifold cavity 44 has an outlet opening 45 formed in the lower face of the engine 23. This outlet opening 45 communicates with an exhaust passage 46 that is formed in the spacer plate 25 and which communicates with an exhaust pipe 47 that depends into an expansion chamber 48 formed by an inner shell 49 within the drive shaft housing 24. This expansion chamber 48 is closed at its upper end by a wall 51 formed on the lower surface of the spacer plate 25 and through which the passage 46 opens. Exhaust gases from the individual cylinders pass through the manifold outlet 45, passage 46, and exhaust pipe 47 where they can expand in the expansion chamber 48 to provide silencing and a static supercharging effect, as will become apparent.

The outer shell 49 is formed with a discharge opening 52 in its lower end that communicates with an exhaust gas outlet passage 53 formed in the lower unit 26. The passage 53 terminates in a rearwardly extending exhaust gas discharge 54 that is normally positioned below the water level and which may be comprised of an exhaust through the propeller of a known type.

The turbo-charger 27 includes a main housing assembly that is mounted on the side of the engine 23 and includes a compressor stage 55 and a turbine stage 56. The turbine stage 56 receives exhaust gases from the manifold cavity 44 through a turbine stage inlet 57 that communicates with an opening 58 formed in the manifold at approximately its center point. The exhaust gases are discharged from the turbine stage 56 through a discharge manifold 59 that communicates at its inlet end with the discharge side of the turbine stage 56 and at its outlet end with a turbo-charger exhaust passage 61 formed in the spacer plate 25 and which communicates with the expansion chamber 48.

The compressor stage 55 has an air inlet opening 62 that communicates with the area within the outer cowling of the power head 22. The air which has been compressed by the compressor stage 55 is transmitted through a conduit 63 to a sealed air intake device 64 which surrounds the carburetors 42 so as to pressurize the carburetors and so as to deliver compressed air to their inlets.

In accordance with a feature of the invention, a control valve 65 is positioned in the spacer passage 46 and is interconnected with the throttle linkage of the associated motor 23 so as to be substantially fully closed at idle and low speed running conditions and to open at higher speed running conditions. This has the effect of diverting exhaust gases immediately across the turbo-charger turbine stage 56 even at low speeds so as to insure an adequate boost under these running conditions. In addition, there is a tuning effect in the exhaust system that will give rise to a further improved induction effect, which can be best understood by reference to FIGS. 4 and 5.

Referring first to FIG. 4, the pressure P in relation to crank angle θ is shown for each of the three cylinders of the engine, these being the three curves identified by the letters A, B and C in this figure. The opening of the exhaust ports is identified by the line EO and the closing the exhaust ports is indicated by the point EC. The opening of the scavenge ports is noted by the line SO and the closing the scavenge ports is noted by the line SC. The valve or porting of the various cylinders is configured so that the exhaust pulses from one cylinder will flow back through the manifold chamber 44 to another chamber so as to create a positive pressure at the exhaust port of this other cylinder which tends to prevent the passage of fresh fuel/air mixture through the scavenge ports and back out the exhaust port of this other cylinder. This additional pressure is indicated by the point Δ PA for the respective cylinders. When the control valve 65 is closed, the turbo-charger turbine stage 56 acts to cause the generations of these pulses. As the control valve 65 is opened, the expansion chamber 48 will cause the exhaust gases to follow the path shown by the phantom line arrows to reflect off the wall 51 and create the pressure impulses as shown in FIG. 5 so as to achieve the same effect.

Embodiment of FIGS. 6 Through 9

As has been noted in conjunction with the embodiment of FIGS. 1 through 5, it is the normal practice with two cycle crankcase compression engines to tune the exhaust to create a positive pressure pulse from the exhaust of one cylinder to act on the exhaust port of another cylinder so as to prevent the through flow of fresh fuel/air mixture from the scavenge ports through to the exhaust port. By employing a turbo-charger in the exhaust system, this tuning effect may be altered somewhat. Although the construction shown in FIGS. 1 through 5 is intended to insure this result, the construction shown in FIGS. 6 through 9 will permit conventional tuning and preclude the supercharger from interfering with the tuning effect of the exhaust pulses. In this embodiment, the construction of the basis components of the engine is the same as the embodiment of FIGS. 1 through 5 and, for that reason, the components which are the same or substantially the same in construction have been identified by the same reference numeral and their description will only be repeated insofar as is necessary to understand the construction and operation of this embodiment.

In this embodiment, the outboard motor is identified generally by the reference numeral 81 and a spacer plate 82 connects the power head and specifically the motor 23 with a drive shaft housing 83. The drive shaft housing 83 has affixed to it a lower unit 26 having an exhaust passage 53 that terminates in a suitable exhaust gas outlet 54 such as a through the propeller exhaust as in the embodiment of FIGS. 1 through 5.

In accordance with this invention, the exhaust gas chamber 44 has only a single outlet 84 formed in its lower face. That is, the turbo-charger, to be described, does not communicate directly with the chamber 44. The exhaust gas outlet 84 communicates with an exhaust gas passage 85 formed in the spacer plate 82 which delivers exhaust gases to an exhaust pipe 86 that depends downwardly into an expansion chamber 87 formed by a shell 88 contained within the drive shaft housing 83. These exhaust gases are adapted to reflect off of an upper wall 89 of the expansion chamber 87 formed by a lower surface of the spacer plate 82.

In accordance with the invention, the turbine stage 56 of the turbo-charger 27 has an inlet conduit 91 that defines an inlet passageway 92 which, in turn, communicates with a turbine exhaust gas passage 93 formed in the spacer plate. The passage 93 communicates with the area above the expansion chamber 87 immediately adjacent the exhaust pipe 86. As a result of the routing, all of the exhaust gases from the expansion chamber 87 must flow through the turbine stage inlet through the passage 93 and passage 92.

The exhaust gases from the turbine stage 56 are discharged through a discharge conduit 94 which extends through the expansion chamber 87 but which is isolated from it. The conduit 94 has a lower end 95 that extends through a wall at the lower end of the shell 88 and which discharges into an expansion chamber 96. The expansion chamber 96 communicates with the lower unit exhaust passage 53 for discharge of the exhaust gases under water.

In accordance with the operation of this embodiment, the exhaust gases all flow from the respective cylinder exhaust ports 43 into the chamber 44 and through the spacer plate passage 85 to the expansion chamber 87. The exhaust gases can then flow through the turbine stage passage 93 for passage across the turbine stage 56 and discharge into the expansion chamber 96 through the exhaust gas outlet 95 of the conduit 94. Some portion of the exhaust gases will also reflect off the wall 89 and cause pressure pulses as shown by the phantom line arrows which will give the static supercharging effect on the individual exhaust ports as shown in the curve of FIG. 9. The effect of the curve is the same as that in connection with the description of FIGS. 4 and 5 of the embodiment of FIG. 1 and, for that reason, the description will not be repeated. It should be noted, however, that each exhaust pulse from a respective cylinder will create a pressure pulse or another cylinder at the time the scavenge port is closed so as to prevent the through flow of fresh fuel/air mixture through the exhaust ports.

Embodiment of FIGS. 10 Through 13

An outboard motor constructed in accordance with another embodiment of the invention is identified generally by the reference numeral 101. The mechanical components of the outboard motor 101 and specifically the mechanical components of its internal combustion engine 23 are substantially the same as the previously described embodiments. For that reason, these components have been identified by the same reference numerals and will not be described again. This embodiment differs from the previously described embodiments only in the construction of the exhaust system and the constructed and drive of the turbo-charger 27 and, for that reason, only these components will be described in detail.

In this embodiment, the exhaust chamber 44 has a downwardly facing outlet opening 102 that communicates with an exhaust passage 103 formed in the spacer plate 25. The exhaust gas passage 103 communicates with an exhaust pipe 104 that extends into an expansion chamber 105 formed by a shell 106 in the drive shaft housing 24. The exhaust gases which enter this chamber can reflect off of an upper wall 107 formed by the lower surface of the spacer plate 25. Unlike the previously described embodiments, the expansion chamber 105 does not communicate with the exhaust outlet passage 53 of the lower unit. That is, in this embodiment, the chamber 105 acts as a side branch chamber in that no exhaust gases flow through this chamber.

The turbine stage 56 of the turbo-charger 27 has an inlet side 108 that communicates with an outlet 109 formed in the manifold chamber 44 for delivery of exhaust gases to the turbine stage 56. The exhaust gases that have passed through the turbine stage 56 are redelivered by means of a return conduit 111 to an exhaust passage 112 in the spacer plate 25. The exhaust passage 112 extends to an upper end of an exhaust discharge pipe 113 that extends through but which is sealed from the expansion chamber 105. The pipe 113 has a lower end 114 that registers with an expansion chamber 115 which, in turn, communicates with the lower unit exhaust gas passage 53.

Figures 12, 13:
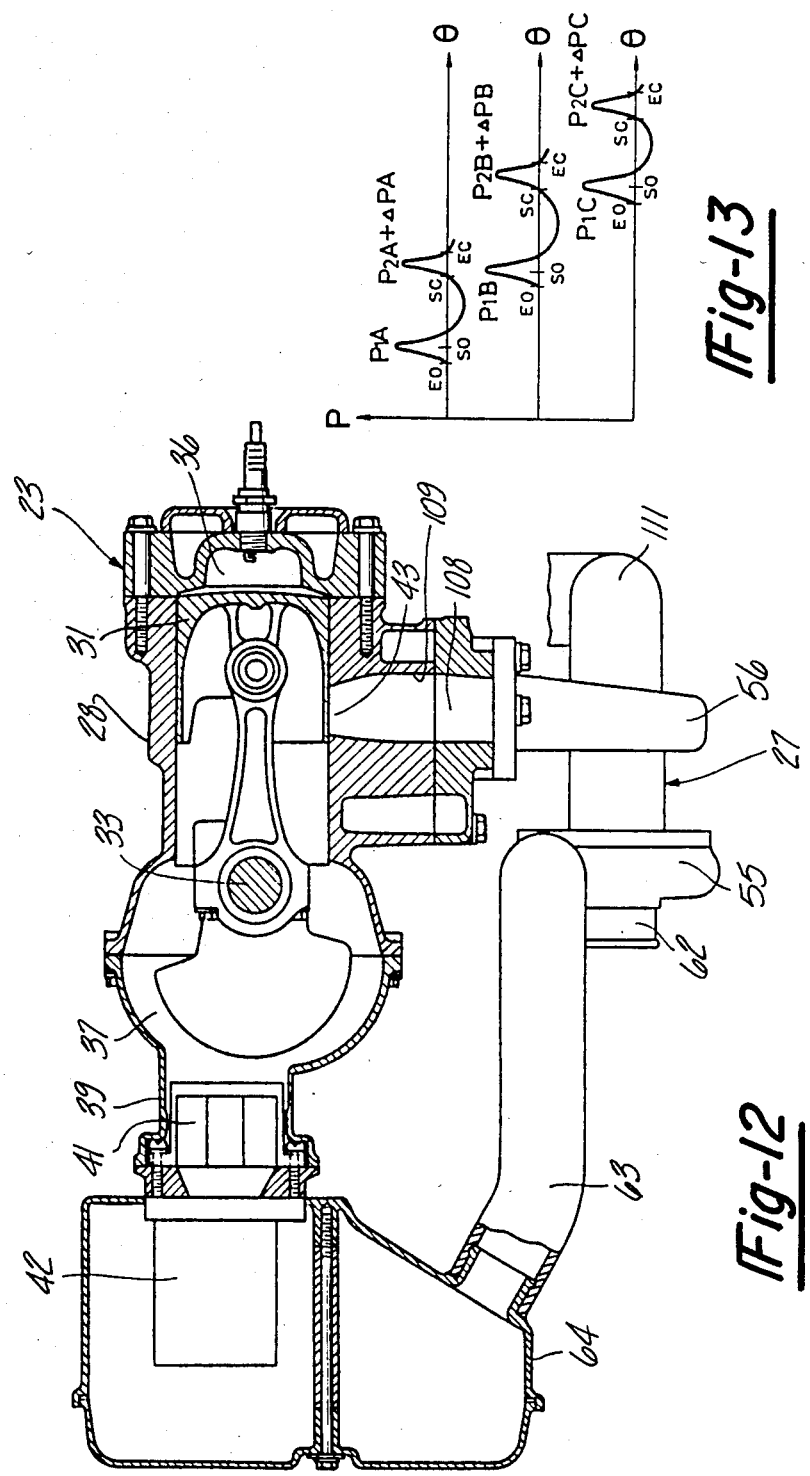
FIG. 12 is a cross-sectional view taken generally along the line 12—12 of FIG. 11.
FIG. 13 is a graphical view, in part similar to FIGS. 4, 5 and 9, showing the pressure characteristics of this embodiment.

FIG. 13 shows the pressure pulses at the individual exhaust ports of the engine. As with the previously described embodiments, the expansion chamber 105 will give pressure pulses reflected back from the exhaust port of one cylinder to that of another cylinder to produce a peak pulse Δ PA that will tend to prevent the through flow of fuel/air mixture from the scavenge passages to the exhaust ports at such times as both ports are open. In other regards, except as hereinafter noted, the construction of this embodiment and its operation is the same as those previously described.

Figure 14:
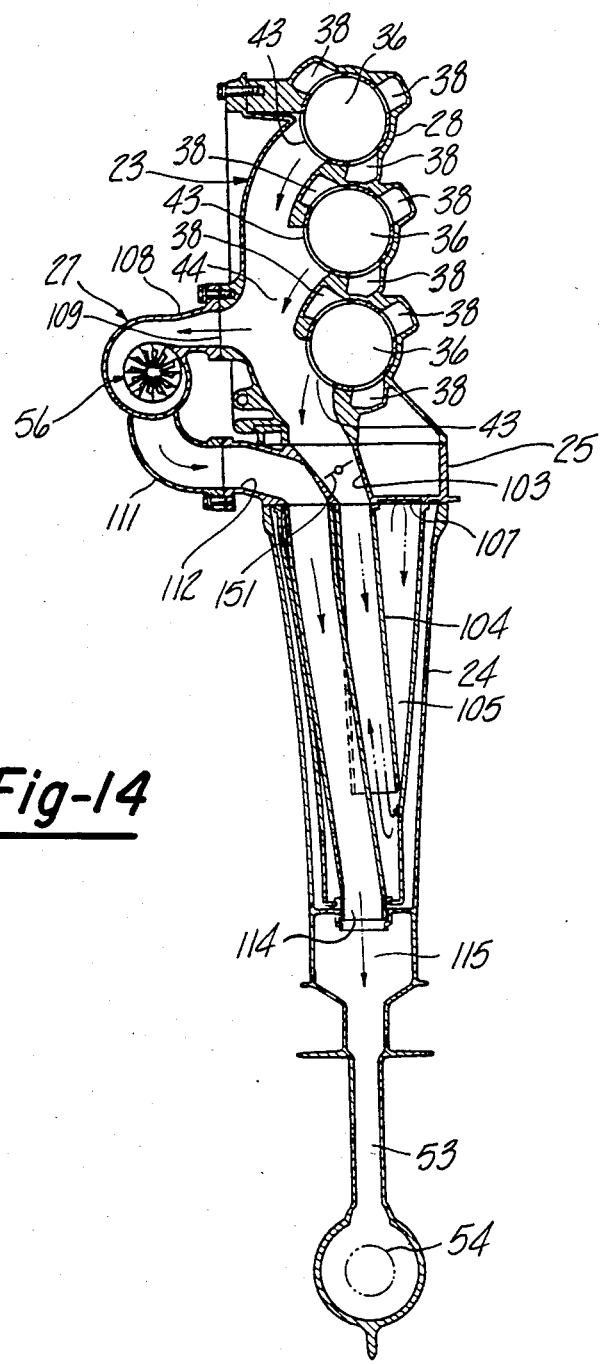
FIG. 14 is a cross-sectional view, in part similar to FIGS. 1, 6 and 10, showing a still further embodiment of the invention.

Embodiment of FIG. 14

FIG. 14 illustrates another embodiment of the invention that is generally the same as the embodiment of FIGS. 10 through 13. For this reason, the similar components have been identified by the same reference numerals and will not be described again.

In accordance with this embodiment, a control valve 151 is positioned in the spacer passage 103 so as to selectively close this passage and discontinue the operation of the expansion chamber 105. This embodiment operates so that the control valve 151 is closed during low and medium range performance and all of the exhaust gases flow directly across the turbine stage 56 of the turbo-charger 27. The tuning effect of the side brance chamber 105 is thus obviated under such low speed running conditions.

However, as wide open throttle condition is reached, the control valve 151 is opened through a suitable linkage and the side branch chamber 105 is operative to provide a pulsation effect tuning the exhaust gases and embodying a static type of supercharging for the exhaust ports, the principle of which has been previously discussed.

It should be readily apparent from the foregoing description that several embodiments of the invention have been disclosed that facilitate turbo-charging without affecting the port tuning of a two-cycle engine. In addition, a relatively compact arrangement is provided and the assurance of good boost at low engine speeds is also accomplished.

Although a number of embodiments of the invention have been illustrated and described, various changes and modifications may be made without departing from the spirit and scope of the invention, as defined by the appended claims.

We claim:

1. A turbo-charger arrangement for an internal combustion engine having an exhaust chamber for receiving exhaust gases from a plurality of exhaust ports of respective engine chambers, an outlet from said exhaust chamber, an exhaust pipe having an inlet end communicating with said exhaust chamber outlet and an outlet end, a turbo-charger having a turbine stage inlet communicating directly with said exhaust chamber and a turbine outlet, valve means for closing said outlet for directing substantially all of the flow of exhaust gases from said exhaust chamber to said turbo-charger turbine stage inlet without flowing through said exhaust pipe, and an expansion chamber, said exhaust pipe extending into said expansion chamber with its outlet end opening directly into said expansion chamber.

2. A turbo-charger arrangement as set forth in claim 1 wherein the turbine outlet discharges into the expansion chamber.

3. A turbo-charger arrangement as set forth in claim 1 wherein the turbine outlet discharges directly to the atmosphere and not into the expansion chamber.

4. A turbo-charger arrangement as set forth in claim 3 wherein the expansion chamber communicates with the atmosphere only through the turbine stage outlet.

5. An outboard motor having a power head containing an internal combustion engine, a drive shaft housing depending from the power head and adapted to contain a drive shaft driven by an engine output shaft, and a spacer plate interposed between said power head and said drive shaft housing, said internal combustion engine having an exhaust chamber for receiving exhaust gases from an exhaust port of an engine chamber, an outlet from said exhaust chamber, an exhaust pipe having an inlet end communicating with said exhaust chamber outlet and an outlet end, a turbo-charger having a turbine stage inlet communicating directly with said exhaust chamber and a turbine outlet, and valve means for closing said outlet for directing substantially all of the flow of exhaust gases from said exhaust chamber to said turbo-charger turbine stage inlet without flowing through said exhaust pipe, said spacer plate having an exhaust passage communicating said exhaust chamber outlet with said exhaust pipe, said valve means being rotatably journaled in said spacer plate, said exhaust pipe depending into said drive shaft housing.

6. An outboard motor as set forth in claim 5 wherein the engine has a plurality of chambers each having respective exhaust ports exhausting into the exhaust chamber.

7. An outboard motor as set forth in claim 6 further including an expansion chamber formed in the drive shaft housing, the exhaust pipe extending into said expansion chamber and having its outlet end opening directly into said expansion chamber.

8. An outboard motor as set forth in claim 7 wherein the turbine outlet communicates with the expansion chamber.

9. An outboard motor as set forth in claim 7 wherein the turbine outlet discharges to the atmosphere without opening into the expansion chamber.

10. An outboard motor as set forth in claim 9 wherein the expansion chamber communicates with the atmosphere only through the turbine stage outlet.

11. A turbo-charger arrangement for a two-cycle crankcase compression combustion engine having an exhaust chamber for receiving exhaust gases from an exhaust port of an engine chamber, an outlet from said exhaust chamber, an exhaust pipe having an inlet end communicating with said exhaust chamber outlet and an outlet end, a turbo-charger having a turbine stage inlet communicating directly with said exhaust chamber and a turbine outlet, said turbo-charger including a compressor stage for delivering a compressed charge to the engine crankcase, and valve means for closing said outlet for directing substantially all of the flow of exhaust gases from said exhaust chamber to said turbo-charger turbine stage inlet without flowing through said exhaust pipe, an expansion chamber, said exhaust pipe extending into said expansion chamber with its outlet end opening directly into said expansion chamber.

12. A turbo-charger arrangement as set forth in claim 11 wherein the engine has a plurality of chambers each having respective exhaust ports exhausting into the exhaust chamber.

13. A turbo-charger arrangement as set forth in claim 11 wherein the turbine outlet discharges into the expansion chamber.

14. A turbo-charger arrangement as set forth in claim 11 wherein the turbine outlet discharges directly to the atmosphere and not into the expansion chamber.

15. A turbo-charger arrangement as set forth in claim 14 wherein the expansion chamber communicates with the atmosphere only through the turbine stage outlet.

16. A turbo-charger arrangement as set forth in claim 11 in combination with an outboard motor having a power head containing the internal combustion engine, a drive shaft housing depending from the power head and adapted to contain a drive shaft driven by the engine output shaft, and a spacer plate interposed between said power head and said drive shaft housing and having an exhaust passage communicating the exhaust chamber outlet with the exhaust pipe and in which said valve means is rotatably journaled, said exhaust pipe depending into said drive shaft housing.

17. A turbo-charger arrangement as set forth in claim 16 wherein the engine has a plurality of chambers each having respective exhaust ports exhausting into the exhaust chamber.

18. A turbo-charger arrangement as set forth in claim 17 further including an expansion chamber formed within the drive shaft housing, the exhaust pipe extending into said expansion chamber with the exhaust pipe outlet end opening directly into said expansion chamber.

19. A turbo-charger arrangement as set forth in claim 18 wherein the turbine outlet communicates with the expansion chamber.

20. A turbo-charger arrangement as set forth in claim 18 wherein the turbine outlet discharges directly to the atmosphere and not into the expansion chamber.

21. A turbo-charger arrangement as set forth in claim 20 wherein the expansion chamber communicates with the atmosphere only through the turbine stage outlet.

22. In an outboard motor including a power head containing a two-cycle, crankcase compression, multiple cylinder internal combustion engine having the cylinders firing at different times, a drive shaft housing depending from said power head and adapted to contain a drive shaft driven by an output shaft of said engine and a lower unit depending from the drive shaft housing and adapted to drive an associated watercraft, an exhaust collector for receiving exhaust gases from the cylinders, an exhaust system including an exhaust pipe extending from said exhaust collector, an expansion chamber, an exhaust pipe extending into and discharging into said expansion chamber for receipt of said exhaust gases from said exhaust collector and a turbo-charger having a turbine stage inlet port and a discharge port, one of said turbine ports being in communication with said expansion chamber, said expansion chamber being positioned within said drive shaft housing, the exhaust gases being discharged from said turbine discharge port through an elongated pipe that extends through said expansion chamber and terminates in the lower unit, said elongated pipe being out of communication with the expansion chamber.

* * * * *